United States Patent
O'Connor et al.

(10) Patent No.: US 11,390,263 B2
(45) Date of Patent: Jul. 19, 2022

(54) FORAGE HARVESTER WITH AUTOMATIC DETECTION OF RECEIVING VEHICLE

(71) Applicant: Deere & Company, Moline, IL (US)

(72) Inventors: Kellen O'Connor, Grimes, IA (US); Jeremy J. Faust, Grimes, IA (US); Zachary T. Bonefas, Grimes, IA (US)

(73) Assignee: Deere & Company, Moline, IL (US)

( * ) Notice: Subject to any disclaimer, the term of this patent is extended or adjusted under 35 U.S.C. 154(b) by 88 days.

(21) Appl. No.: 16/865,467

(22) Filed: May 4, 2020

(65) Prior Publication Data

US 2021/0339729 A1 Nov. 4, 2021

(51) Int. Cl.
*B60W 10/04* (2006.01)
*A01D 90/02* (2006.01)
*B60W 10/30* (2006.01)

(52) U.S. Cl.
CPC ............ *B60W 10/04* (2013.01); *A01D 90/02* (2013.01); *B60W 10/30* (2013.01); *B60W 2300/158* (2013.01); *B60W 2420/42* (2013.01); *B60W 2520/10* (2013.01); *B60W 2554/4023* (2020.02); *B60W 2554/4041* (2020.02); *B60W 2710/30* (2013.01); *B60W 2720/10* (2013.01)

(58) Field of Classification Search
CPC .................. B60W 10/04; B60W 10/30; B60W 2554/4041; B60W 2420/42; B60W 2300/158; B60W 2554/4023; B60W 2520/10; B60W 2720/10; B60W 2710/30; A01D 90/02; A01D 41/1217; A01D 41/1278; A01D 43/077; A01D 43/087; A01B 69/008; G05D 1/0293; G05D 2201/0201

See application file for complete search history.

(56) References Cited

U.S. PATENT DOCUMENTS

| 4,376,609 A * | 3/1983 | Bohman | A01D 43/073 356/138 |
| 6,247,510 B1 * | 6/2001 | Diekhans | A01D 43/073 141/192 |

(Continued)

FOREIGN PATENT DOCUMENTS

| EP | 2579701 B1 | 3/2015 |
| EP | 2510775 B1 | 8/2016 |

(Continued)

OTHER PUBLICATIONS

Extended European Search Report and Written Opinion issued in European Patent Application No. 21168958.3, dated Oct. 1, 2021, in 08 pages.

*Primary Examiner* — Babar Sarwar
(74) *Attorney, Agent, or Firm* — Joseph R. Kelly; Kelly, Holt & Christenson PLLC

(57) ABSTRACT

A sensor detects a variable indicative of a position of a receiving vehicle relative to a harvester during a harvester operation in which a material conveyance subsystem on the harvester is conveying harvested material to the receiving vehicle. If the receiving vehicle is in a compromised position in which it is out of range of the material conveyance subsystem or is about to be out of range, then a control signal is generated that can alert the operator of the harvester, automatically control harvester speed, or perform other control operations.

19 Claims, 8 Drawing Sheets

(56) References Cited

U.S. PATENT DOCUMENTS

| | | | | |
|---|---|---|---|---|
| 6,682,416 B2* | 1/2004 | Behnke | A01B 69/008 | |
| | | | 141/231 | |
| 6,943,824 B2* | 9/2005 | Alexia | A01D 43/073 | |
| | | | 348/120 | |
| 7,677,169 B2* | 3/2010 | Covington | A01D 46/085 | |
| | | | 100/35 | |
| 8,380,401 B2* | 2/2013 | Pighi | A01D 41/127 | |
| | | | 701/50 | |
| 8,499,537 B2* | 8/2013 | Correns | A01D 43/087 | |
| | | | 56/10.2 E | |
| 9,119,342 B2 | 9/2015 | Bonefas | | |
| 9,392,746 B2* | 7/2016 | Darr | A01D 43/087 | |
| 9,642,305 B2 | 5/2017 | Nykamp et al. | | |
| 9,764,910 B2* | 9/2017 | Berning | E01C 23/088 | |
| 10,100,470 B2* | 10/2018 | Berning | E01C 23/01 | |
| 2003/0063968 A1* | 4/2003 | Zaun | A01C 15/003 | |
| | | | 414/546 | |
| 2009/0044505 A1* | 2/2009 | Huster | A01D 43/087 | |
| | | | 56/10.2 R | |
| 2010/0070144 A1* | 3/2010 | Burke | A01D 41/1217 | |
| | | | 701/50 | |
| 2010/0108188 A1* | 5/2010 | Correns | A01D 43/087 | |
| | | | 141/83 | |
| 2010/0274452 A1* | 10/2010 | Ringwald | A01B 69/008 | |
| | | | 701/50 | |
| 2010/0332051 A1* | 12/2010 | Kormann | A01F 12/46 | |
| | | | 701/2 | |
| 2012/0213619 A1* | 8/2012 | Burke | A01D 41/1217 | |
| | | | 414/341 | |
| 2013/0213518 A1* | 8/2013 | Bonefas | A01D 75/00 | |
| | | | 141/1 | |
| 2013/0227922 A1* | 9/2013 | Zametzer | A01D 41/127 | |
| | | | 56/10.2 R | |
| 2014/0224377 A1* | 8/2014 | Bonefas | A01D 43/073 | |
| | | | 141/1 | |
| 2014/0311113 A1* | 10/2014 | Bonefas | A01D 34/001 | |
| | | | 56/10.2 R | |
| 2014/0350801 A1* | 11/2014 | Bonefas | B60R 11/04 | |
| | | | 701/50 | |
| 2017/0042088 A1* | 2/2017 | Nykamp | A01D 41/127 | |
| 2017/0042089 A1* | 2/2017 | Bonefas | B60R 1/00 | |
| 2017/0055446 A1* | 3/2017 | Nykamp | A01D 43/073 | |
| 2017/0147005 A1 | 5/2017 | Ramm et al. | | |
| 2017/0206645 A1* | 7/2017 | Bonefas | G06T 7/62 | |
| 2017/0245435 A1* | 8/2017 | Rusciolelli | A01D 41/1278 | |

FOREIGN PATENT DOCUMENTS

| | | |
|---|---|---|
| EP | 3062597 A1 | 9/2016 |
| EP | 2954769 B1 | 12/2017 |
| EP | 3315005 A1 | 5/2018 |
| EP | 2893797 B1 | 7/2018 |
| WO | WO2015063078 A1 | 5/2015 |

* cited by examiner

FORAGE HARVESTER WITH AUTOMATIC DETECTION OF RECEIVING VEHICLE

FIELD OF THE DESCRIPTION

The present description relates to harvesting machines. More specifically, the present description relates to automatically identifying whether a receiving vehicle is in the proper position relative to the harvester, and controlling the harvester accordingly.

BACKGROUND

There are a wide variety of different types of agricultural vehicles. Some vehicles include harvesters, such as a forage harvesters, and other harvesters, that harvest grain or other crop. Such harvesters often unload into carts which may be pulled by tractors or semi-trailers as the harvesters are moving.

By way of example, while harvesting in a field using a forage harvester, an operator attempts to control the forage harvester to maintain harvesting efficiency, during many different types of conditions. The soil conditions, crop conditions, etc., can all change. This may result in the operator changing control settings. This means that the operator needs to devote a relatively large amount of attention to controlling the forage harvester.

At the same time, a semi-truck or tractor-pulled cart is often in position relative to the forage harvester (e.g., behind the forage harvester or alongside the forage harvester) so that the forage harvester can fill the truck or cart while moving through the field. In some current systems, this requires the operator of the forage harvester to control the position of the unloading spout and flap so that the truck or cart is filled evenly, but not overfilled. Even a momentary misalignment between the spout and the truck or cart may result in hundreds of pounds of harvested material being dumped on the ground, or elsewhere, rather than in the truck or cart.

The discussion above is merely provided for general background information and is not intended to be used as an aid in determining the scope of the claimed subject matter.

SUMMARY

A sensor detects a variable indicative of a position of a receiving vehicle relative to a harvester during a harvester operation in which a material conveyance subsystem on the harvester is conveying harvested material to the receiving vehicle. If the receiving vehicle is in a compromised position in which it is out of range of the material conveyance subsystem, or is about to be out of range, then a control signal is generated that can alert the operator of the harvester, automatically control harvester speed, or perform other control operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it can be very difficult for an operator to maintain high efficiency in controlling a forage harvester, and also to optimally monitor the position of the receiving vehicle. This difficulty can even be exacerbated when the receiving vehicle is located behind the forage harvester, so that the forage harvester is executing a rear unloading operation, but the difficulty also exists in side-by-side unloading scenarios.

In order to address these issues, some automatic cart filling control systems have been developed to automate portions of the filling process. These types of systems currently provide automation for simplifying the unloading process. One such automatic fill control system uses a stereo camera on the spout of the harvester to capture an image of the harvesting vehicle. An image processing system determines dimensions of the receiving vehicle and the distribution of the crop deposited inside it. The system also detects crop height within the receiving vehicle, in order to automatically aim the spout toward empty spots and control the flap position to achieve a more even fill, while reducing spillage.

However, some forage harvesters do not have such an automatic cart filling control system. Even where they do, there may be instantaneous changes in the position of the receiving vehicle, relative to the forage harvester, that put the receiving vehicle in a compromised position. By a compromised position it is meant that, in one example, the receiving vessel on the receiving vehicle is out of range of the harvested material, or is soon to be out of range, so that the harvested material will so no longer land (or no longer lands) on the receiving vessel. This may result from a sudden deceleration of the receiving vessel, or acceleration of the harvester. For instance, the receiving vehicle may get stuck in muddy soil, while the forage harvester keeps moving. The receiving vehicle may fall behind the forage harvester for other reasons as well.

If this happens, and the forage harvester operator does not know it in time to take corrective action, the harvested material can sometimes impact and damage the towing vehicle (e.g., by breaking the windshield, etc.). Similarly, if the trailing vehicle falls behind for any reason, this can result in hundreds of pounds of harvested material being dumped onto the ground, rather than into the receiving vessel on the receiving vehicle.

The present description thus proceeds with respect to a harvester that automatically detects when the receiving vessel is in a compromised position (so that the harvested material is no longer landing in the receiving vessel or the receiving vessel is about to be out of range of the harvested material). A control signal is generated to alert the operator and/or automatically control the harvester.

Figure 1:
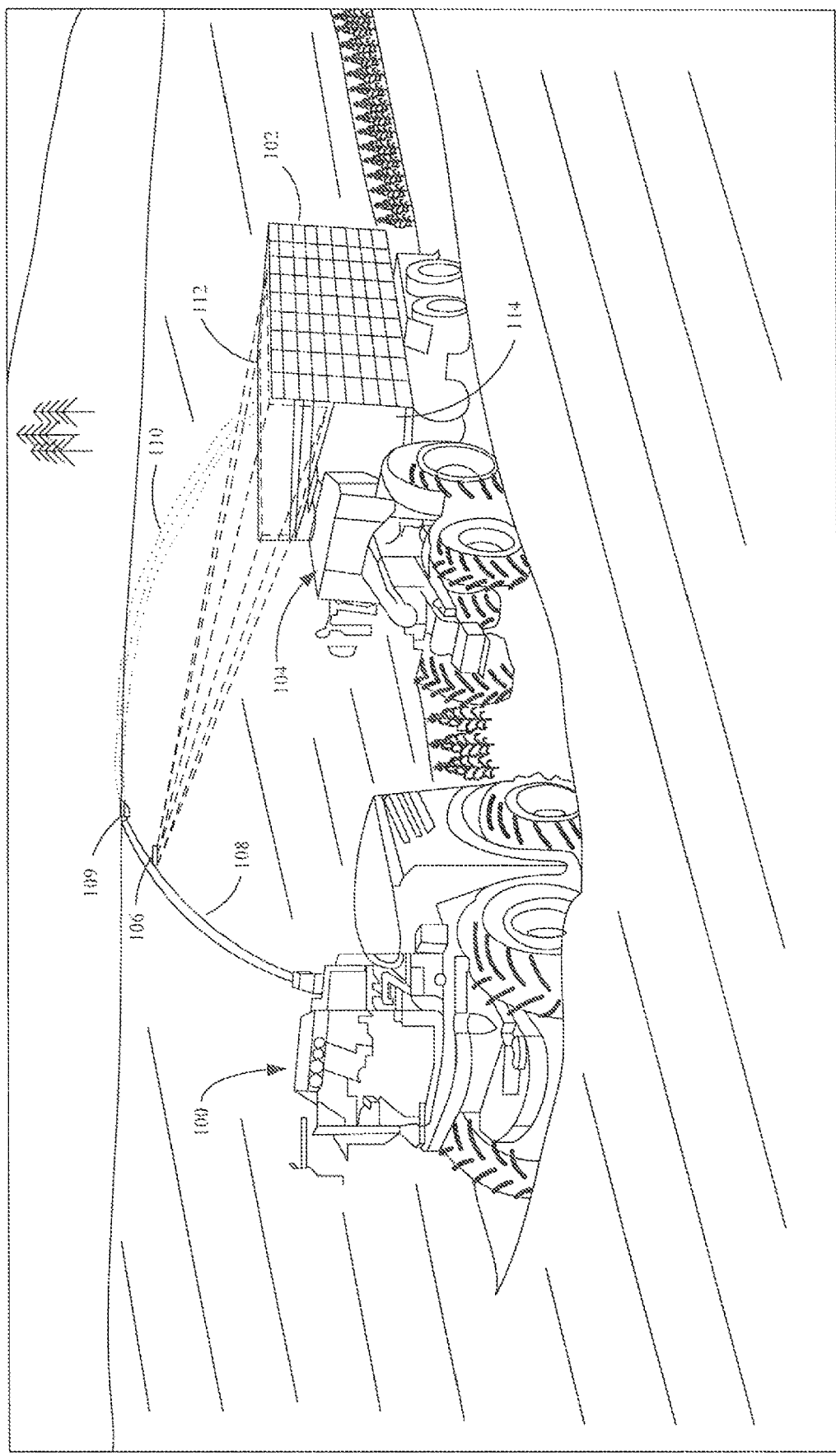
FIG. 1 is a pictorial illustration of one example of a forage harvester filling a receiving vehicle, with the receiving vehicle in a position behind the forage harvester.

FIG. 1 is a pictorial illustration showing one example of a self-propelled forage harvester 100 filling a tractor-pulled drain cart (or receiving vehicle) 102. The interior of cart 102 thus forms a receiving vessel 103 for receiving harvested material. In the example shown in FIG. 1, a tractor 104, that is pulling grain cart 102, is positioned directly behind forage harvester 100. Also, in the example illustrated in FIG. 1, forage harvester 100 has a camera 106 mounted on the spout 108 through which the harvested material 110 is traveling. Camera 106 captures an image of the receiving area 112 of cart 102. When harvester 100 has an automatic cart filling control system that includes image processing, as discussed above, that system can gauge the height of harvested material in cart 102, and the location of that material. It thus automatically controls the position of spout 108 and flap 109 to direct the trajectory of material 110 into the receiving area 112 of cart 102 to obtain an even fill throughout the entire length of cart 102, while not overfilling cart 102. By automatically it is meant, for example, that the operation is performed without further human involvement except, perhaps, to initiate or authorize the operation.

In one example, regardless of whether harvester 100 has an automatic cart filling control system, camera 106 is a stereo camera. Thus, the images captured by camera 106 can be used to determine how far receiving vehicle 102 is behind harvester 100. This can be used (as discussed below) to determine when receiving vehicle 102 is too far behind harvester 100 so it no longer receives the harvested material.

Figure 2:
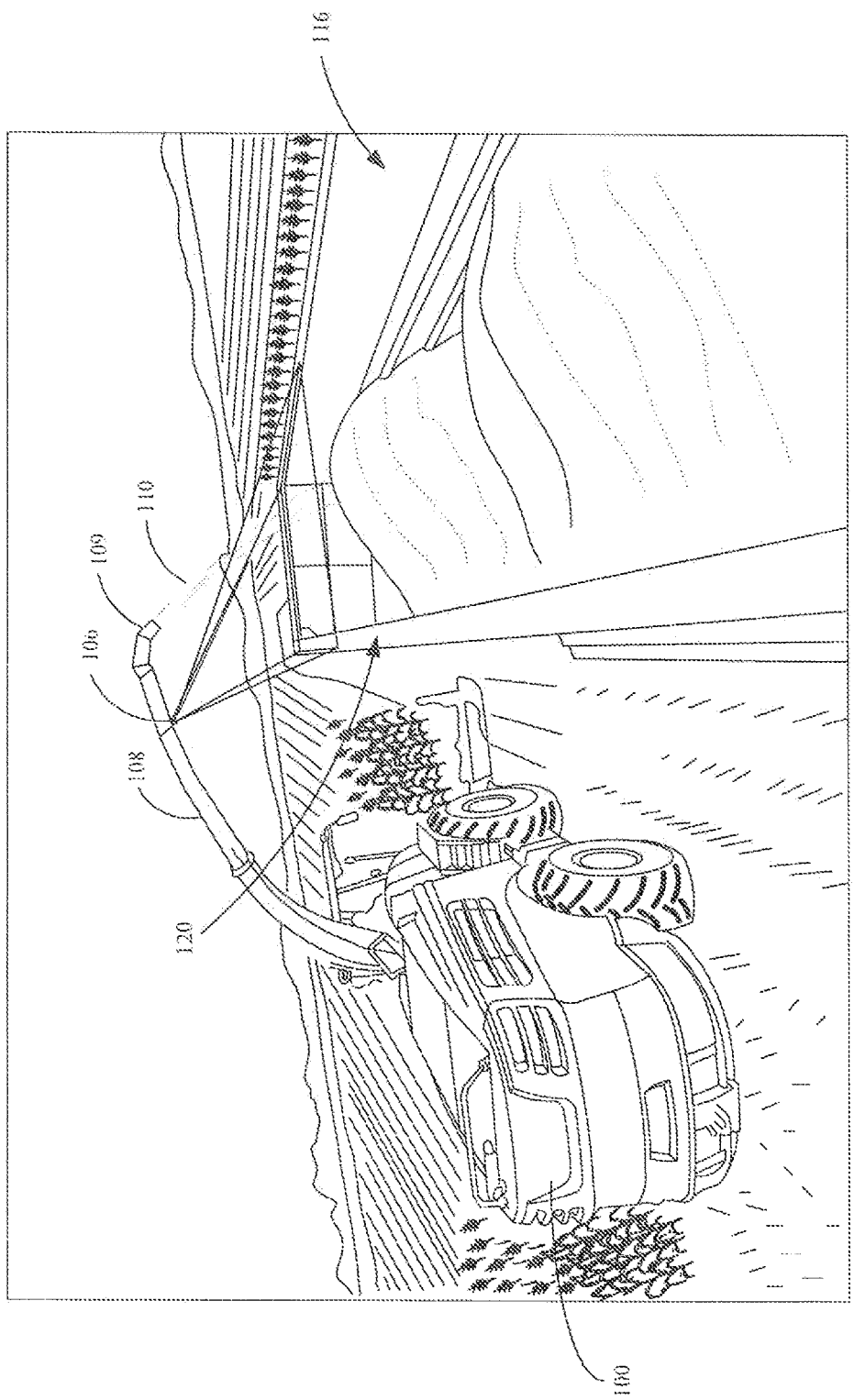
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 116 in a configuration in which a semitractor is pulling semi-trailer 116 alongside forage harvester 100. Therefore, the spout 108 and flap 109 are positioned to unload the harvested material 110 to fill trailer 116 according to a pre-defined side-by-side fill strategy. Again, FIG. 2 shows that camera 106 can capture an image of semi-trailer 116. In the example illustrated in FIG. 2, the field of view of camera 106 is directed toward the receiving area of trailer 116 so that image processing can be performed to identify the distance between harvester 100 and trailer 116.

Figure 3:
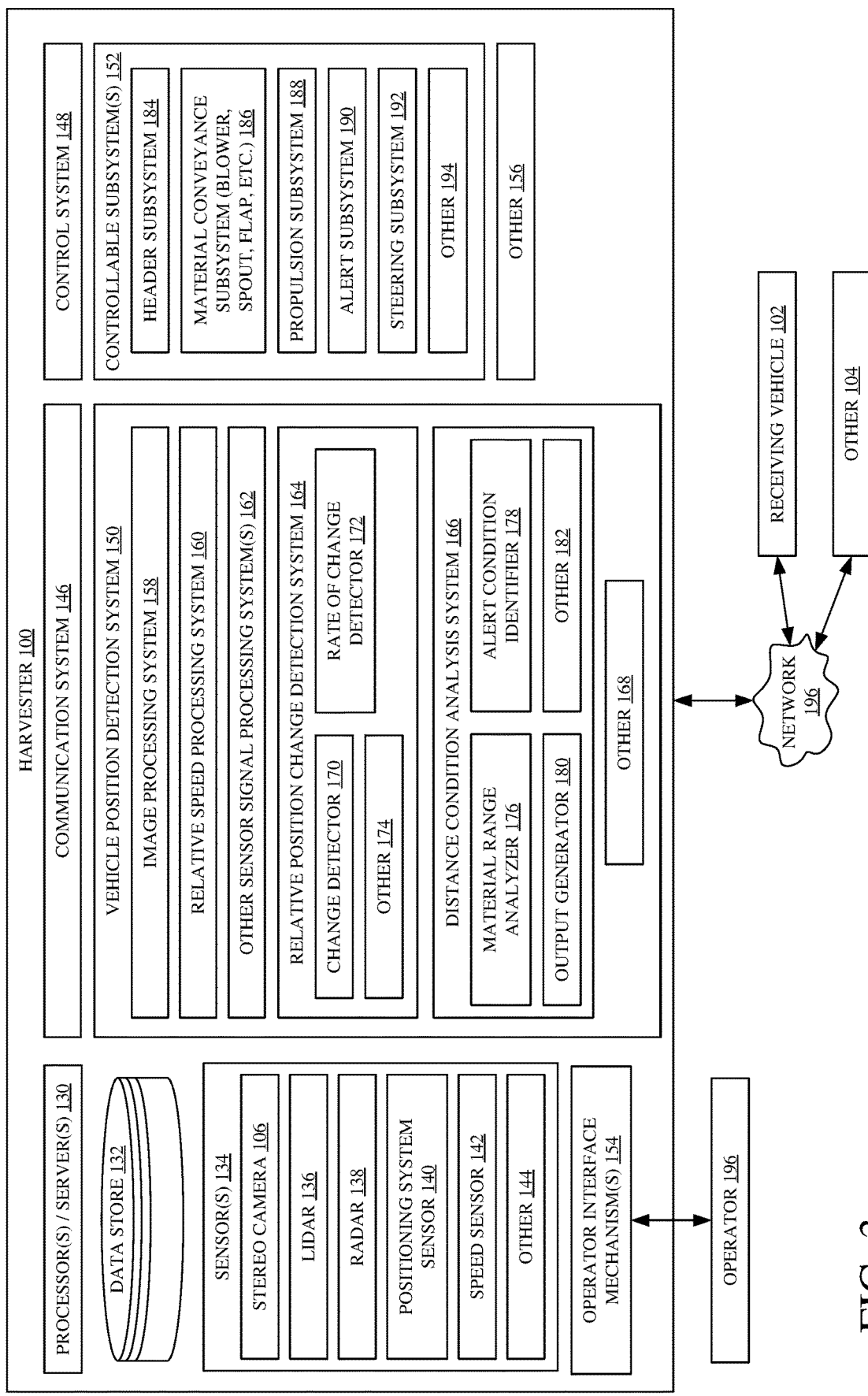
FIG. 3 is a block diagram of one example of a harvester.

FIG. 3 is a block diagram showing one example of harvester 100, in more detail. Harvester 100 illustratively includes processors or servers 130, data store 132, a set of sensors 134 (which can include stereo camera 106, LIDAR sensor 136, RADAR sensor 138, positioning system sensor 140, speed sensor 142, and other sensors 144), communication system 146, control system 148, vehicle position detection system 150, controllable subsystems 152, operator interface mechanisms 154, and it can include other items 156. Vehicle position detection system 150 illustratively includes image processing system 158, relative speed processing system 160, other sensor signal processing system 162, relative position change detector 164, distance condition analysis system 166, and it can include other items 168. Relative position change detection system 164 includes change detector 170, rate of change detector 172, and it can include other items 174. Distance condition analysis system 166 can include material range analyzer 176, alert condition identifier 178, output generator 180, and it can include other items 182 as well. controllable subsystems 152 can include a header subsystem 184, material conveyance subsystem (e.g., spout, blower, flap, etc.) 186, propulsion subsystem 188, alert subsystem 190, steering subsystem 192, and it can include other items 194.

FIG. 3 also shows that, in one example, operator 196 can interact with operator interface mechanisms 154 in order to control and manipulate harvester 100. Therefore, operator interface mechanisms 154 can be any of a wide variety of operator interface mechanisms, such as levers, joysticks, steering wheels, pedals, linkages, buttons, a touch sensitive display screen, among other things.

In addition, receiving vehicle 102, and other remote systems 104 can communicate with harvester 100 over network 196. Network 196 can thus be any of a wide variety of different types of networks, such as a near field communication, wide area network, a local area network, a cellular communication network, or any of a wide variety of other networks or combinations of networks.

Before describing the overall operation of harvester 100, a brief description of some of the items in harvester 100, and their operation, will first be provided.

As discussed above, stereo camera 106 can capture an image of the receiving vehicle (either the cart, or the pulling vehicle, or both) and capture stereo images that can be processed to identify a distance of the receiving vehicle from harvester 100. The same can be done with a LIDAR sensor 136 or a RADAR sensor 138. In addition, positioning system sensor 140 can be a GPS receiver or other positioning system that receives coordinates of the receiver 140 in a global or local coordinate system. Communication system 146 can be configured to communicate with receiving vehicle 102 over network 196. Thus, harvester 100 and vehicle 102 can communicate their positions and these positions can be used to determine vehicle speed, the positions of the vehicles relative to one another, and other items.

Speed sensor 142 can be a sensor that senses the speed of rotation of an axle, or a ground-engaging element (such as a wheel), or it can be another sensor that provides an indication of ground speed of harvester 100. It will be noted that receiving vehicle 102 can also be fitted with a speed sensor so that the speed of vehicle 102 can be communicated (using communication system 146) to harvester 100. Harvester 100 can of course have a wide variety of other sensors 144 as well.

Vehicle position detection system 150 detects the relative positions of harvester 100 and receiving vehicle 102, with respect to one another. Thus, it can be determined whether receiving vehicle 102 is in a compromised position in which it is too far behind harvester 100 or is falling behind, and out of position for receiving harvested material from harvester 100. As discussed above, this can happen relatively rapidly, based on unexpected rapid decelerations of vehicle 102 or accelerations of harvester 100, based on unexpected stoppages of receiving vehicle 102, or for a wide variety of other reasons. Vehicle position detection system 150 provides an output to control system 148 indicative of the relative positions of harvester 100 and vehicle 102.

When those positions indicate that action should be taken, control system 148 generates control signals to control one or more of the controllable subsystems 152. For instance, when vehicle position detection system 150 determines that receiving vehicle 102 is too far behind, and out of position relative to harvester 100, or is quickly falling behind harvester 100 so that it will soon be out of position, then it can provide an indication of this to control system 148.

Control system 148 can provide a control signal to control the propulsion subsystem 188 of harvester 100 to slow down or stop harvester 100, until receiving vehicle 102 again attains the proper following position. Control system 148 can generate a control signal to control alert subsystem 190 to surface an alert on operator interface mechanisms 154 for operator 196. Control system 148 can generate a control signal to control material conveyance subsystem 186 to control the blower, spout or flap position, etc. Control system 148 can also generate control signals to control the header subsystem 184, the steering subsystem 192 or other controllable subsystems 194.

In addition, control system 148 can generate control signals to control multiple controllable subsystems 152. For instance, if receiving vehicle 102 is falling behind, control system 148 can generate a control signal to control propulsion subsystem 188 to stop harvester 100. It can also generate control signals to control header subsystem 184 to stop operation, and to control material conveyance subsystem 186 to stop the blower from delivering harvested material. These are just some examples of how control system 148 can generate control signals to control the various controllable subsystems 152 on harvester 100, based upon an output from vehicle position detection system 150 that the receiving vehicle is in a compromised position (e.g., it is out of position or is quickly falling out of position).

The particular configuration of vehicle position detection system 150 may vary, based upon the particular sensors 134 that it uses to identify the relative positions of harvester 100 and receiving vehicle 102. For instance, when stereo camera images from stereo camera 106 are used to determine those positions, then image processing system 158 is used to identify the distance between the two vehicles based upon the stereo camera images received. When speed signals are received (such as a speed signal from speed sensor 142 and a speed signal from receiving vehicle 102, or a speed derived from positioning system sensor 140 and a similar sensor on receiving vehicle 102), then relative speed processing system 160 can analyze the speed signals to determine whether receiving vehicle 102 is falling out of position. For instance, if the speed of harvester 100 has unexpectedly accelerated relative to the speed of receiving vehicle 102, or if the speed of receiving vehicle 102 has unexpectedly decelerated relative to the speed of harvester 100, then relative speed processing system 160 can identify this as a situation where receiving vehicle 102 may be falling out of position.

If other sensors (such as LIDAR sensor 136, RADAR sensor 138, or other sensors 144) are used to identify the relative positions of the two vehicles, then other signal processing system 162 can process those signals. System 162 can identify a situation in which receiving vehicle 102 is out of position, or is about to be out of position.

Relative position change detection system 164 can then identify characteristics of the change in the relative position of the two vehicles. For instance, based upon the change in speed and the duration of that change in speed, or based upon the changes in relative position obtained by image processing system 158, or based upon the other variables that can be provided to system 150 and that indicate the relative distance between the two vehicles 100 and 102, change detector 170 can detect whether that relative position has changed. Rate of change detector 172 determines the rate of change. For instance, if the change in position is relatively small, and has happened relatively slowly, then this may indicate a momentary, and reasonable, change in position. However, if the magnitude of the change in distance is relatively high, and it happened relatively quickly, then this may indicate that receiving vehicle 102 will quickly be out of position to receive the harvested material from harvester 100.

Distance condition analysis system 166 analyzes the position of the two vehicles relative to one another, and how that position has changed, to determine whether some action needs to be taken by control system 148. In one example, distance condition analysis system 166 receives the relative position of the two vehicles, relative to one another, and determines whether vehicle 102 is out of position. If so, output generator 180 generates an output to control system 148 indicating that receiving vehicle 102 is out of position. In that case, control system 148 can generate control signals to control the controllable subsystems 152 as described above.

In another example, distance condition analysis system 166 can consider the range of material conveyance subsystem 186 (e.g., how far subsystem 186 can blow the harvested material). For instance, if vehicle 102 has recently dropped further behind harvester 100, but the distance between the two vehicles is still acceptable, because the trajectory of the material can be changed, so that the receiving vessel on the receiving vehicle 102 is still within range of the conveyance subsystem 186, then material range analyzer 176 can identify this. Conversely, if vehicle 102 is out of range of the material conveyance subsystem 186, or is soon to be out of range (e.g., vehicle 102 is in a compromised position), then analyzer 176 can identify this as well.

Alert condition identifier 178 can identify whether the current distance between the vehicles, and/or the characteristics of the distance between the two vehicles (e.g., whether it is steady, changing rapidly, etc.) corresponds to any of a given number of different alert conditions. For instance, if the two vehicles are within range of one another, and the distance between them is not changing significantly, then alert condition identifier 178 may identify that there is no alert condition present. However, if the two vehicles are still within range of one another, but the distance between them is changing relatively rapidly, then alert condition identifier 178 may identify an alert condition that indicates that the current distance is acceptable, but that the vehicles are quickly diverging so that vehicle 102 may quickly become out of range. If the two vehicles are already out of range of one another, then alert condition identifier 178 may identify this as a higher level of alert that requires more immediate action.

Based upon the type of alert condition, output generator 180 can generate a corresponding output to control system 148. Control system 148 can then generate the appropriate control signals to control controllable subsystems 152, based on the alert level or alter condition.

Figure 4:
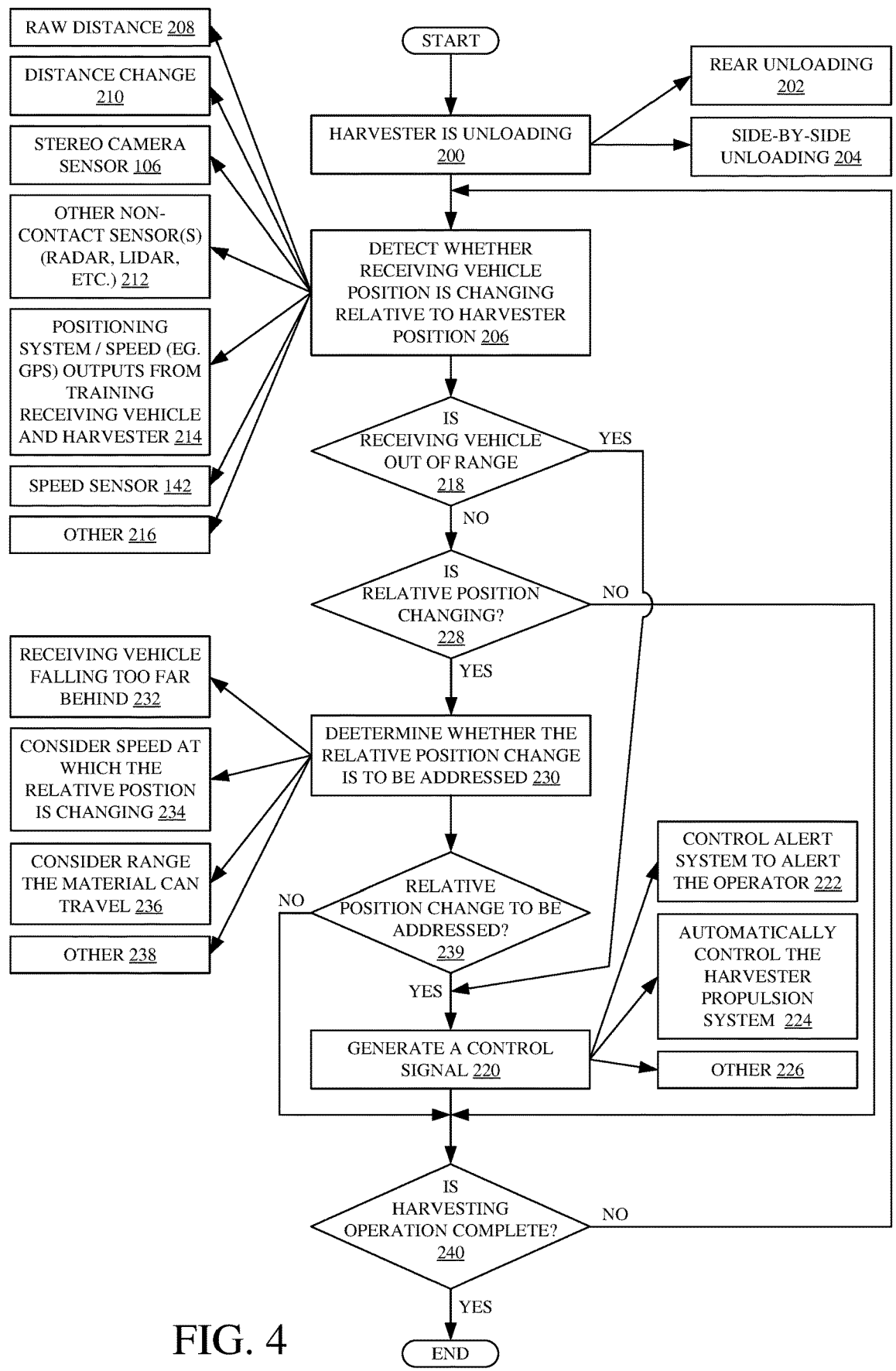
FIG. 4 is a flow diagram illustrating one example of the operation of the harvester illustrated in previous figures in detecting the position of a receiving vehicle, and generating a control signal based upon that position.

FIG. 4 is a flow diagram illustrating one example of the operation of harvester 100 in identifying the relative positions of harvester 100 and receiving vehicle 102, and controlling harvester 100 based upon that relative distance. It is first assumed that harvester 100 is unloading material into a receiving vehicle 102. This is indicated by block 200 in the flow diagram of FIG. 4. Receiving vehicle 102 may be in a rear unloading position, in which it is traveling substantially directly behind harvester 100. This is indicated by block 202. Receiving vehicle 102 may be in a side-by-side unloading position as well. This is indicated by block 204.

Vehicle position detection system 150 then detects a characteristic of the position of the receiving vehicle 102 relative to the harvester 100. This is indicated by block 206. As discussed above, system 150 can use one of its components, and an input from one or more of sensors 134, to identify the raw distance between the two vehicles. This is indicated by block 208. Relative position change detection system 164 can detect the change in distance, as well as one or more other characteristics of that change. This is indicated by block 210. The characteristic of the position of the two vehicles relative to one another can be based on an analysis of an input from stereo camera 106. It can be based on an input from other non-contact sensors, such as LIDAR 136, RADAR 138, or other sensors 144. This is indicated by block 212 in the flow diagram of FIG. 4. The characteristic of the position of the two vehicles relative to one another can be generated based upon inputs from positioning system sensor 140 and a similar input from receiving vehicle 102. This is indicated by block 214 in the flow diagram of FIG. 4. The characteristic of the position of the two vehicles relative to one another can be determined based on inputs from speed sensor 142 (and possibly an input from a speed sensor on receiving vehicle 102). The characteristic of the distance can be detected in other ways as well, and this is indicated by block 216 in the flow diagram of FIG. 4.

Vehicle position detection system 150 then detects whether receiving vehicle 102 is in a compromised position in which it is no longer receiving the harvested material, or will soon be in a position that it no longer receives the harvested material (e.g., a position in which the proper conveyance of harvested material to receiving vehicle 102 is compromised). If the raw distance 208 between the two vehicles is sensed, then distance condition analysis system 166 can determine whether receiving vehicle 102 is out of position (e.g., out of range of the material being transferred from harvester 100). This is indicated by block 218 in the flow diagram of FIG. 4. If so, then output generator 180 generates an output indicative of this to control system 148 and control system 148 generates one or more control signals based on that output.

Generating control signals is generated by block 220 in the flow diagram of FIG. 4. In one example, control system 148 controls alert subsystem 190 to generate an alert on operator interface mechanisms 154 for operator 196. This is indicated by block 222. The alert can be any type of audio, visual or haptic output that alerts operator 196 to the fact that receiving vehicle 102 is out of range, or out of position. Control system 148 can also generate a control signal to control one or more of controllable subsystems 152 to automatically control harvester 100 to take action based upon the indication that the two vehicles are out of range of one another. For instance, control system 148 can automatically control propulsion subsystem 188 to slow down, or stop, harvester 100. This is indicated by block 224 in the flow diagram of FIG. 4. It can control any one or more of the controllable subsystems 152 in a wide variety of other ways as well (some of which were discussed above), and this is indicated by block 226 in the flow diagram of FIG. 4.

If, at block 218, distance condition analysis system 166 determines that receiving vehicle 102 is not yet out of range, then system 166 determines whether the relative position of the two vehicles is changing. This is indicated by block 228 in the flow diagram of FIG. 4. Thus, the distance between the two vehicles is changing, then distance condition analysis system 166 determines whether the relative position change needs to be addressed. This is indicated by block 239. For instance, system 166 determines whether receiving vehicle 102 is in danger of becoming out of position relative to harvester 100. If so, then output generator 180 generates an output indicative of this to control system 148 which, in turn, generates control signals to control the controllable subsystems 152. Determining whether the relative position change is to be addressed is indicated by block 230 in the flow diagram of FIG. 4.

As discussed above, distance condition analysis system 166 can make this determination in a wide variety of different ways. For instance, distance condition analysis system 166 can determine whether receiving vehicle 102 is falling too far behind harvester 100, so that action should be taken to reduce the likelihood that harvested material will no longer be received by receiving vehicle 102. Determining whether the receiving vehicle is falling too far behind harvester 100 is indicated by block 232. In another example, distance condition analysis system 166 can consider the speed or rate at which the relative position of the two vehicles is changing. It can, for instance, receive an output from relative position change detector 164 indicating how quickly receiving vehicle 102 is falling behind harvester 100 (e.g., in feet per second or in other units). If it is falling behind harvester 100 relatively quickly (e.g., at a rate that meets a threshold level), then an alert condition may be generated to take action more promptly. If it is falling behind harvester 100 only by a small distance, and relatively slowly (e.g., at a rate that meets a different threshold level), then a different alert condition can be generated, and different actions can be taken, or no action may be taken, and the system simply waits to analyze how the distance is changing in the future. Considering the speed at which the relative position between the two vehicles is changing is indicated by block 234 in the flow diagram of FIG. 4.

Material range analyzer 176 can also analyze the changing distance between the two vehicles in view of the range over which material conveyance subsystem 186 can convey the material to the receiving vehicle 102. For instance, if the distance is changing but the distance between the two vehicles is still within an acceptable range, so that material conveyance subsystem 186 can still convey the material far enough to be received by receiving vehicle 102, then it may be that a low level alert condition is generated, simply indicating that vehicle 102 is falling behind, but that it is still within range. However, if material range analyzer 176 determines that receiving vehicle 102 is quickly falling out of range, and will soon be outside the range of the material conveyance subsystem 186, then a higher level alert may be indicated, meaning that more immediate control responses are appropriate. Considering the range over which the material can be conveyed by material conveyance subsystem 186 is indicated by block 236 in the flow diagram of FIG. 4. Determining whether the change in distance between the two vehicles needs to be addressed can be done by distance condition analysis system 166 in any of a variety of other ways as well, and this is indicted by block 238 in the flow diagram of FIG. 4.

This type of vehicle position detection and control can continue until the harvesting operation is complete. This is indicated by block 240 in the flow diagram of FIG. 4.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
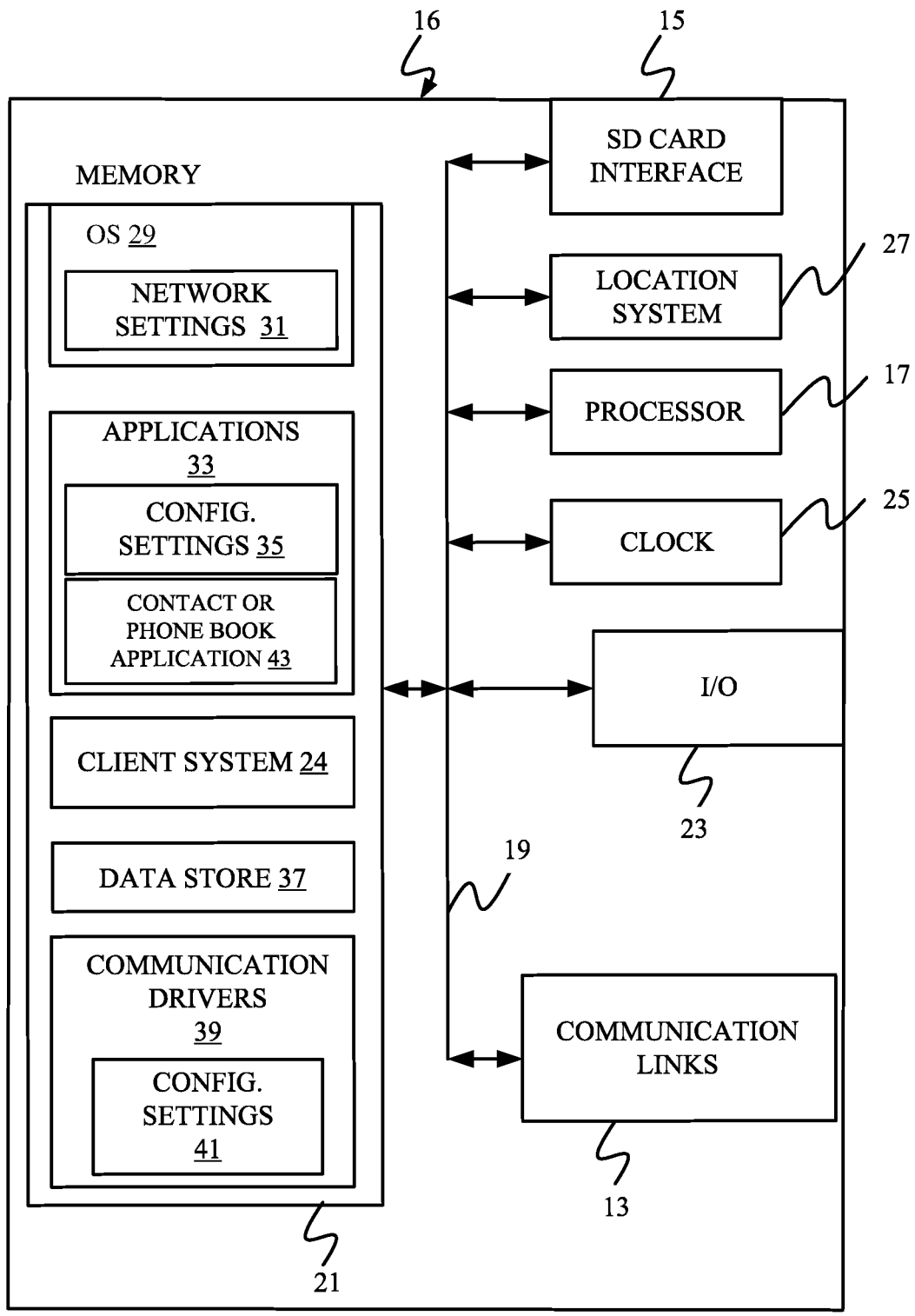
FIGS. 5-7 show examples of mobile devices that can be used in the machines and systems shown in the previous figures.
Figure 6:
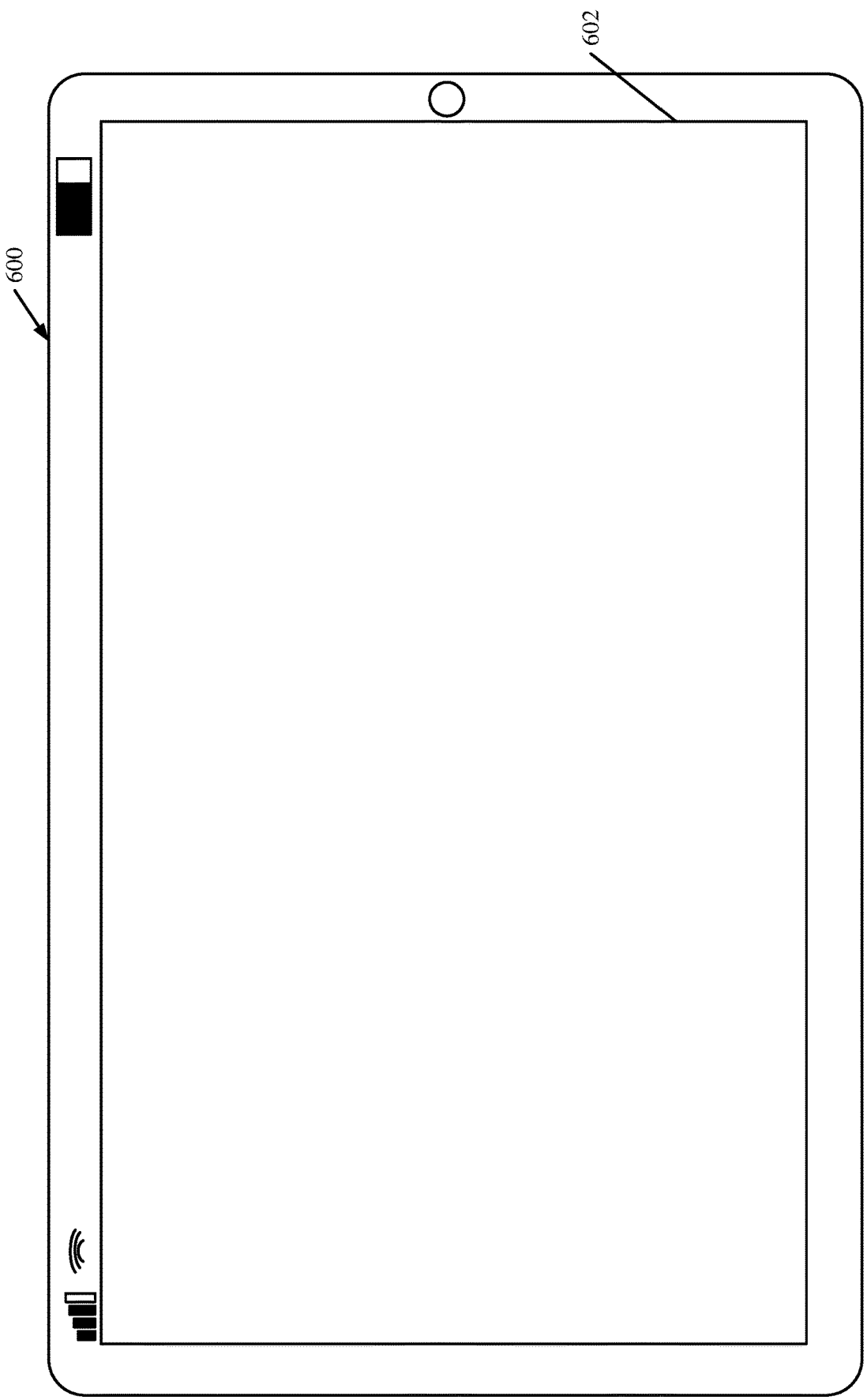
Figure 7:
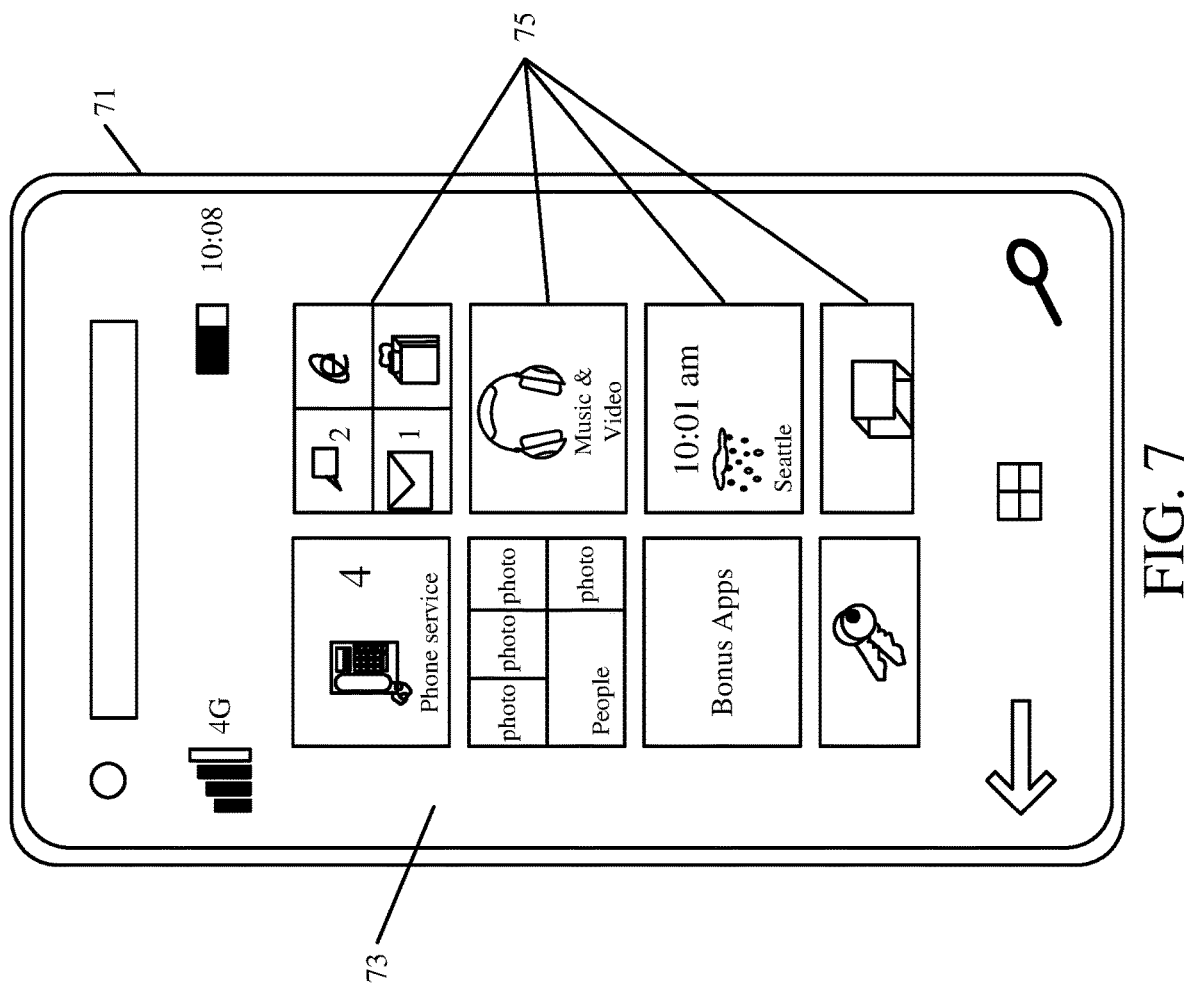

FIG. 5 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the information discussed above. FIGS. 6-7 are examples of handheld or mobile devices.

FIG. 5 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors/servers 130 from FIG. 3) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
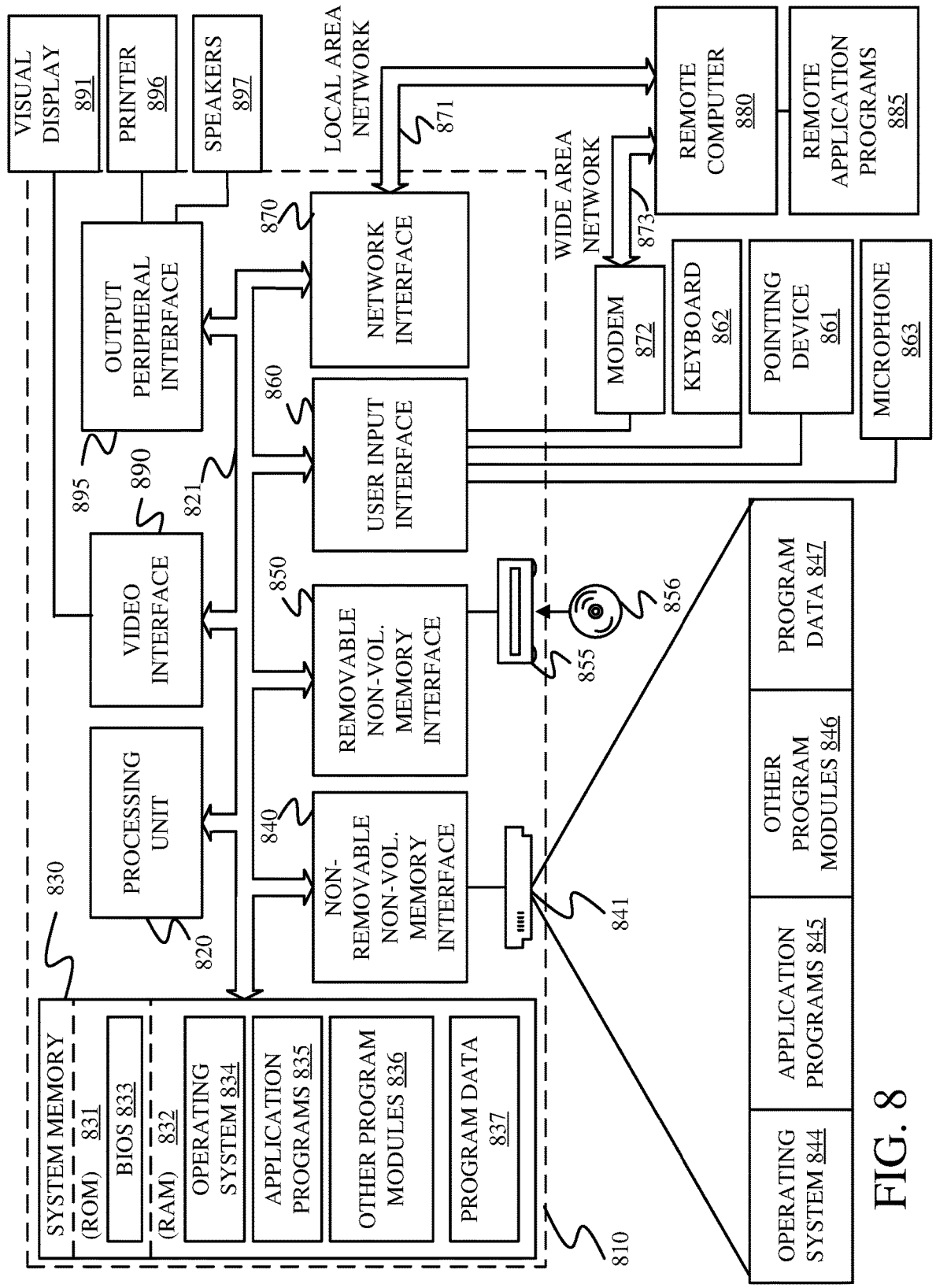
FIG. 8 is a block diagram of a computing environment that can be used in the machines and systems shown in the previous figures.

FIG. 8 is one example of a computing environment in which elements of FIG. 1, or parts of it, (for example) can be deployed. With reference to FIG. 8, an example system for implementing some embodiments includes a computing device in the form of a computer 810 programmed to operate as discussed above. Components of computer 810 may include, but are not limited to, a processing unit 820 (which can comprise processor or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a computer implemented method of controlling a harvester, comprising:

controlling a material conveyance subsystem to convey harvested material to a receiving vessel in a receiving vehicle, as the harvester is performing a harvesting operation;

detecting a characteristic of a position of the harvester relative to a position of the receiving vehicle;

determining whether the receiving vehicle is in a compromised position relative to the harvester, in which conveyance of the harvested material to the receiving vessel is compromised, based on the characteristic of the position of the harvester relative to the position of the receiving vehicle; and if the receiving vehicle is in the compromised position, then generating a control signal to control a controllable subsystem of the harvester.

Example 2 is the computer implemented method of any or all previous examples wherein detecting a characteristic of the position of the harvester relative to the receiving vehicle comprises determining whether the receiving vehicle is out of range of the material conveyance subsystem so the material conveyance subsystem is not conveying the harvested material to the receiving vessel of the receiving vehicle, and wherein determining whether the receiving vehicle is in a compromised position comprises:

if the characteristic of the position of the harvester relative to the position of the receiving vehicle indicates that the receiving vehicle is out of range of the material conveyance subsystem, then determining that the receiving vehicle is in the compromised position.

Example 3 is the computer implemented method of any or all previous examples wherein determining whether the receiving vehicle is in a compromised position comprises:

determining whether the receiving vehicle is likely to be out of range of the material conveyance subsystem within a time threshold; and if so, determining that the receiving vehicle is in the compromised position.

Example 4 is the computer implemented method of any or all previous examples wherein detecting a characteristic of the harvester relative to the receiving vehicle comprises:

detecting whether a relative speed has changed, the relative speed comprising a measure of a speed of the receiving vehicle compared to a speed of the harvester; and generating a speed change indicator indicative of a detected change in the relative speed.

Example 5 is the computer implemented method of any or all previous examples wherein detecting a characteristic of the position of the harvester relative to the receiving vehicle comprises:

identifying an amount by which the relative speed has changed; and generating a speed change magnitude signal indicative of the amount of the change in the relative speed.

Example 6 is the computer implemented method of any or all previous examples wherein detecting a characteristic of the position of the harvester relative to the receiving vehicle comprises:

detecting a rate of change of the relative speed; and generating a rate of change signal indicative of the detected rate of change.

Example 7 is the computer implemented method of any or all previous examples wherein determining whether the receiving vehicle is likely to be out of range of the material conveyance subsystem within a time threshold comprises:

determining whether the receiving vehicle is likely to be out of range of the material conveyance subsystem based on the speed change magnitude signal, the rate of change signal and the range of the material conveyance subsystem.

Example 8 is the computer implemented method of any or all previous examples wherein detecting a characteristic of a position of the harvester relative to a position of the receiving vehicle comprises:

receiving a set of images from a stereo camera;

processing the set of stereo images to detect a distance between the harvester and the receiving vehicle; and outputting a characteristic signal indicative of the detected distance.

Example 9 is the computer implemented method of any or all previous examples wherein detecting a characteristic of a position of the harvester relative to a position of the receiving vehicle comprises:

receiving a receiving vehicle speed signal indicative of a speed of the receiving vehicle;

receiving a harvester speed signal indicative of harvester speed; and generating a speed difference signal indicative of a difference between the speed of the receiving vehicle and the harvester speed.

Example 10 is the computer implemented method of any or all previous examples wherein detecting a characteristic of a position of the harvester relative to a position of the receiving vehicle comprises:

receiving a receiving vehicle position signal, indicative of a position of the receiving vehicle in a coordinate system, from a positioning system on the receiving vehicle;

receiving a harvester position signal, indicative of a position of the harvester in the coordinate system, from a positioning system on the harvester;

detecting a distance between the harvester and the receiving vehicle based on the receiving vehicle position signal and the harvester position signal; and outputting a characteristic signal indicative of the detected distance.

Example 11 is the computer implemented method of any or all previous examples wherein generating a control signal comprises:

identifying an alert level based on the position of the receiving vehicle relative to the compromised position;

identifying a control action is to be performed based on the alert level; and generating the control signal based on the identified control action.

Example 12 is the computer implemented method of any or all previous examples wherein generating the control signal comprises:

generating the control signal to control an alert system to surface an alert to an operator of the harvester.

Example 13 is the computer implemented method of any or all previous examples wherein generating the control signal comprises:

generating a control signal to automatically control a harvester propulsion subsystem.

Example 14 is the computer implemented method of any or all previous examples wherein generating the control signal comprises:

generating a control signal to automatically control the material conveyance subsystem.

Example 15 is a harvester, comprising:

a header that gathers harvested material into the harvester;

a conveyance subsystem that conveys the harvested material from the harvester to a receiving vehicle during a harvesting operation;

a controllable subsystem;

a vehicle position detection system that detects a deceleration of the receiving vehicle relative to the harvester; and a control system that generates a control signal to control the controllable subsystem based on the detected deceleration of the receiving vehicle relative to the harvester, Example 16 is the harvester of any or all previous examples wherein the controllable subsystem comprises:

an operator interface mechanism, wherein the control system generates the control signal to surface an alert to the operator on the operator interface mechanism.

Example 17 is the harvester of any or all previous examples wherein the controllable subsystem comprises a propulsion subsystem and wherein the vehicle position detection system is configured to detect a distance between the harvester and the receiving vehicle and further comprises:

a distance condition analysis system that determines whether the distance exceeds a threshold distance relative to a range of the material conveyance subsystem and wherein the control system automatically controls the propulsion subsystem of the harvester when the distance exceeds the threshold distance.

Example 18 is the harvester of any or all previous examples and further comprising:

a stereo camera that captures images of the receiving vehicle, the vehicle position detection system detecting the distance between the harvester and the receiving vehicle based on the captured images.

Example 19 is a computer implemented method of controlling a harvester, comprising:

detecting an increase in distance between a receiving vehicle and the harvester, during a harvesting operation in which a material conveyance subsystem on the harvester is filling the receiving vehicle with harvested material; and generating a control signal to surface an alert notification to an operator of the harvester based on the detected increase in distance.

Example 20 is the computer implemented method of any or all previous examples wherein detecting an increase in distance comprises:

detecting a deceleration of the receiving vehicle relative to the harvester during the harvesting operation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling a harvester, comprising:
   controlling a material conveyance subsystem to convey harvested material to a receiving vessel in a receiving vehicle, as the harvester is performing a harvesting operation;
   detecting whether a relative speed has changed, the relative speed comprising a measure of a speed of the receiving vehicle compared to a speed of the harvester;
   generating a speed change indicator indicative of a detected change in the relative speed;
   identifying an amount by which the relative speed has changed;
   generating a speed change magnitude signal indicative of the amount of the change in the relative speed;
   detecting a rate of change of the relative speed;
   generating a rate of change signal indicative of the detected rate of change;
   determining whether the receiving vehicle is likely to be out of range of the material conveyance subsystem within a time threshold based on the speed change magnitude signal, the rate of change signal and the range of the material conveyance subsystem; and
   if the receiving vehicle is likely to be out of range of the material conveyance subsystem within the time threshold, then generating a control signal to control a controllable subsystem of the harvester.

2. The computer implemented method of claim 1 wherein detecting whether the relative speed has changed comprises:
   receiving a set of images from a stereo camera;
   processing the set of stereo images to detect a distance between the harvester and the receiving vehicle; and
   outputting a characteristic signal indicative of the detected distance.

3. The computer implemented method of claim 1 wherein detecting whether the relative speed has changed comprises:
   receiving a receiving vehicle speed signal indicative of a speed of the receiving vehicle;
   receiving a harvester speed signal indicative of harvester speed; and
   generating a speed difference signal indicative of a difference between the speed of the receiving vehicle and the harvester speed.

4. The computer implemented method of claim 1 wherein detecting whether the relative speed has changed comprises:
   receiving a receiving vehicle position signal, indicative of a position of the receiving vehicle in a coordinate system, from a positioning system on the receiving vehicle;
   receiving a harvester position signal, indicative of a position of the harvester in the coordinate system, from a positioning system of the harvester;
   detecting a distance between the harvester and the receiving vehicle based on the receiving vehicle position signal and the harvester position signal; and
   outputting a characteristic signal indicative of the detected distance.

5. The computer implemented method of claim 1 wherein generating the control signal comprises:
   identifying an alert level based on the determination that the receiving vehicle is likely to be out of range of the material conveyance subsystem within the time threshold;
   identifying a control action is to be performed based on the alert level; and
   generating the control signal based on the identified control action.

6. The computer implemented method of claim 1 wherein generating the control signal comprises:
   generating the control signal to control an alert system to surface an alert to an operator of the harvester.

7. The computer implemented method of claim 1 wherein generating the control signal comprises:
   generating a control signal to automatically control a harvester propulsion subsystem.

8. The computer implemented method of claim 1 wherein generating the control signal comprises:
   generating a control signal to automatically control the material conveyance subsystem.

9. A harvester, comprising:
   a header that gathers harvested material into the harvester;
   a conveyance subsystem that conveys the harvested material from the harvester to a receiving vehicle during a harvesting operation;
   a propulsion subsystem;
   a vehicle position detection system that detects a distance between the harvester and the receiving vehicle and determines whether the distance exceeds a threshold distance relative to a range of the material conveyance subsystem; and
   a control system that generates a control signal to control the propulsion subsystem when the distance exceeds the threshold distance.

10. The harvester of claim 9 and further comprising:
    an operator interface mechanism, wherein the control system generates an additional control signal to surface an alert to the operator on the operator interface mechanism.

11. The harvester of claim 9 and further comprising:
    a stereo camera that captures images of the receiving vehicle, the vehicle position detection system detecting the distance between the harvester and the receiving vehicle based on the captured images.

12. The harvester of claim 9 and further comprising one of a RADAR sensor that detects the receiving vehicle and generates a RADAR sensor signal or a LIDAR sensor that detects the receiving vehicle and generates a LIDAR sensor signal and wherein the vehicle position detection system detects the distance between the harvester and the receiving vehicle based on one of the RADAR sensor signal or the LIDAR sensor signal.

13. The harvester, comprising:
a header that gathers harvested material into the harvester;
a conveyance subsystem that conveys the harvested material from the harvester to a receiving vehicle during a harvesting operation;
a vehicle position detection system that detects a distance between the harvester and the receiving vehicle and determines whether the distance exceeds a threshold distance relative to a range of the material conveyance subsystem; and
a control system that generates a control signal to control a controllable subsystem when the distance exceeds the threshold distance.

14. The harvester of claim 13, wherein the controllable subsystem comprises:
an operator interface mechanism, wherein the control system generates the control signal to surface an alert to the operator on the operator interface mechanism, the alert indicative at the distance between the harvester and the receiving vehicle exceeding the threshold distance.

15. The harvester of claim 13, wherein the controllable subsystem comprises the conveyance subsystem, wherein the control system generates the control signal to adjust an operating parameter of the material conveyance subsystem.

16. The harvester of claim 15, wherein the conveyance subsystem comprises:
a spout;
a flap; and
a blower; and
wherein the control signal generates the control signal to adjust one or more of a position of the spout, a position of the flap, and the operation of the blower.

17. A computer implemented method of controlling a harvester, comprising:
controlling a material conveyance subsystem to convey harvested material to a receiving vessel in a receiving vehicle, as the harvester is performing a harvesting operation;
detecting whether a relative speed has changed, the relative speed comprising a measure of a speed of the receiving vehicle compared to a speed of the harvester;
generating a speed change indicator indicative of a detected change in the relative speed;
determining whether the receiving vehicle is likely to be out of range of the material within a time threshold, based on the detected change in the relative speed and the range of the material conveyance subsystem; and
if the receiving vehicle is likely to be out of range of the material conveyance subsystem within the time threshold, then generating a control signal to control a controllable subsystem of the harvester.

18. The computer implemented method of claim 17, wherein generating the control signal comprises one of:
generating the control signal to control an alert system to surface an alert to an operator of the harvester, the alert indicative of the receiving vehicle being likely to be out of range of the material conveyance subsystem within the time threshold;
generating the control signal to control a propulsion subsystem of the harvester; or
generating the control signal to control the material conveyance subsystem.

19. The computer implemented method of claim 17, wherein detecting whether the relative speed has changed comprises one of:
receiving a receiving vehicle position signal indicative of a position of the receiving vehicle, receiving a harvester position signal indicative of a position of the harvester, and detecting a distance between the harvester and the receiving vehicle based on the receiving vehicle position signal and the harvester position signal;
receiving a set of images from a stereo camera and processing the set of stereo images to detect a distance between the harvester and the receiving vehicle; and
receiving a receiving vehicle speed signal indicative of a speed of the receiving vehicle and receiving a harvester speed signal indicative of harvester speed.

* * * * *